United States Patent [19]
Liu

[11] Patent Number: 4,510,286
[45] Date of Patent: Apr. 9, 1985

[54] BONDING RESIN COMPOSITION

[75] Inventor: Chia-Seng Liu, Newark, Del.

[73] Assignee: Hercules Incorporated, Wilmington, Del.

[21] Appl. No.: 603,804

[22] Filed: Apr. 25, 1984

Related U.S. Application Data

[63] Continuation-in-part of Ser. No. 414,695, Sep. 3, 1982, abandoned.

[51] Int. Cl.$^3$ .................... C08L 35/00; C08L 51/06
[52] U.S. Cl. ................................ 525/71; 525/74
[58] Field of Search .................... 525/71, 74

[56] References Cited

U.S. PATENT DOCUMENTS

| | | | |
|---|---|---|---|
| 3,483,276 | 12/1969 | Mahlman | 525/74 |
| 3,804,919 | 4/1974 | Schrage et al. | 525/74 |
| 4,409,364 | 10/1983 | Schmuckler et al. | 525/74 |
| 4,423,117 | 12/1983 | Machonis, Jr. et al. | 525/71 |

FOREIGN PATENT DOCUMENTS

| | | | |
|---|---|---|---|
| 2721475 | 11/1978 | Fed. Rep. of Germany | 525/74 |
| 1378873 | 12/1974 | United Kingdom | 525/74 |

*Primary Examiner*—Allan M. Lieberman
*Attorney, Agent, or Firm*—William S. Alexander; Dale R. Lovercheck

[57] ABSTRACT

Disclosed is a bonding resin composition composed of a blend consisting essentially of (a) maleic anhydride-modified, stereoregular polypropylene having a combined maleic anhydride content of about 0.5–0.8% by weight of said modified polypropylene, and (b) base polymer material at about 25 parts by weight per part by weight of said maleic anhydride-modified polypropylene. The base polymer material is selected from a group of two combinations.

One combination consists essentially of stereoregular polypropylene and essentially crystalline, sequentially polymerized propylene-ethylene product having a combined ethylene content of about 25% by weight of the product. The weight ratio of the polypropylene to the product is about 1:3–3:1.

The other combination consists essentially of essentially crystalline, sequentially polymerized propylene-ethylene product having a combined ethylene content of about 7% by weight of the product, and essentially crystalline, sequentially polymerized propylene-ethylene product having a combined ethylene content of about 25% by weight of the product. The weight ratio of the two products is about 1:3–3:1.

Also disclosed is a laminate of the bonding resin composition and a metal such as steel or aluminum. Further disclosed is a method for making the laminate.

8 Claims, No Drawings

BONDING RESIN COMPOSITION

This is a continuation-in-part of U.S. patent application Ser. No. 414,695 filed Sept. 3, 1982 and now abandoned.

FIELD OF THE INVENTION

This invention resides in the chemical arts. More particularly, it relates to synthetic resins having adhesive properties, and to the use of such resins.

BACKGROUND OF THE INVENTION

The specification of British Patent No. 1,020,740 discloses the use of maleic anhydride-modified propylene polymers as bonding resins for bonding polyolefins to metals such as steel and aluminum.

The U.S. Pat. No. 3,483,276, to Mahlman discloses blends of maleic anhydride-modified polymers and propylene polymers, and the use of the blends as metal coatings.

These references define propylene polymers to include all polymers derived from propylene, whether essentially amorphous or essentially crystalline, including copolymers, inclusive of block copolymers, of propylene with one or more other monomers.

SUMMARY OF THE INVENTION

This invention, in summary, in one aspect comprises a bonding resin composition composed of a blend consisting essentially of:
(a) maleic anhydride-modified, stereoregular polypropylene having a combined maleic anhydride content of about 0.2–0.8% by weight of said modified polypropylene; and
(b) base polymer material at about 4 to 70 parts by weight per part by weight of said maleic anhydride-modified polypropylene, said material being selected from the group consisting of:
  (i) stereoregular polypropylene and essentially crystalline, sequentially polymerized propylene-ethylene product having a combined ethylene content of about 15 to about 30% by weight of the product, the weight ratio of said polypropylene to said product being about 1:4–4:1, and
  (ii) essentially crystalline, sequentially polymerized propylene-ethylene product having a combined ethylene content of about 0 to about 14% by weight of the product, and essentially crystalline, sequentially polymerized propylene-ethylene product having a combined ethylene content of about 15 to about 30% by weight of the product, the weight ratio of the lower ethylene product to the higher ethylene product being about 1:4–4:1.

DETAILED DESCRIPTION OF THE INVENTION

The maleic-anhydride modified, stereoregular polypropylene component of the bonding resin composition of this invention is well known. It, blended with a hindered phenol and a thio ester as stabilizers at concentrations of 0.4–0.5% by weight thereof, is commercially available as Hercoprime ® A synthetic resin.

Stereoregular polypropylene is well known and commercially available. A preferred stereoregular polypropylene is one having a nominal melt flow rate (ASTM D 1238L, I₂ at 230° C.) of 3–5 dg/min. (decigrams per minute). It, blended with a hindered phenol antioxidant at 50–100 ppm of the polymer, is available as Pro-fax ® 6501 polypropylene.

The essentially crystalline sequentially polymerized propylene-ethylene products likewise are well known and commercially available. They are prepared by sequentially polymerizing propylene and ethylene. They are blends of propylene homopolymer, ethylene homopolymer, and random copolymers of propylene and ethylene. Essentially crystalline, sequentially polymerized propylene-ethylene products having a combined ethylene content of about 7% by weight of the product and blended with a hindered phenol antioxidant at 50–100 ppm of the product are commercially available as the Pro-fax 7000 series products. Essentially crystalline, sequentially polymerized propylene-ethylene products with an ethylene content of about 25% by weight of the product with a hindered phenol antioxidant content of about 50–100 ppm are commercially available as the Pro-fax 8000 series products.

While the weight ratio of the components of each combination in the base polymer material group can vary within the indicated range, a preferred weight ratio when the base polymer material is the (i) combination, is 25:75 (or 1–3), and, when the base polymer material is the (ii) combination, is 50:50 or (1:1).

In addition to the above essential components of the bonding resin composition of this invention, the composition can comprise other components including, for example, additional antioxidants and stabilizers, property improvers, fillers, extenders, and the like.

The bonding resin composition of this invention can be made by normal mixing and melt compounding, procedures. For example, in one embodiment of the method for making the composition, the maleic anhydride-modified stereoregular polypropylene and the base polymer material, both preferably in finely divided or powder condition, and other additives, if any, but preferably comprising an additional stabilizer and an addition antioxidant, are premeasured individually, and then mixed together well in a Henschel mill. The resulting mixture is melt compounded in an extruder at a melt temperature below 290° C. Temperatures higher than 290° C. should be avoided to prevent excessive degradation of the components of the composition. The melt compounded composition is withdrawn from the extruder. It is pelletized and later converted into sheet or film or directly converted into sheet or film.

The bonding resin composition of this invention is useful in bonding essentially crystalline propylene polymer sheets and films to other substrates such as, for example, sheets and films of ethylene-vinyl alcohol copolymer, and sheets and foils of metals such as, for example, steel and aluminum. It also is useful as the synthetic resin in synthetic resin/metal laminates, including metal/synthetic resin/metal laminates.

This invention in another aspect comprises a synthetic resin/metal laminate comprising a sheet consisting essentially of the bonding resin composition directly bonded to a sheet consisting essentially of metal selected from the group consisting of steel and aluminum. In a preferred embodiment the laminate comprises another sheet consisting essentially of the same or different metal bonded to the sheet of bonding resin composition. The laminate can be made by conventional ways and means. In this regard, the bonding resin composition can be made as above, and then extruded as a sheet directly onto a sheet of metal, or between the two sheets of metal, and the combination of sheets is then subjected to heat and pressure to form the laminate. Hence, this invention in still another aspect comprises a method of making the foregoing synthetic resin/metal laminate.

The best mode now contemplated of carrying out this invention, is illustrated by the following examples. This invention is not limited to these examples.

EXAMPLES 1 and 2

These examples illustrate preferred embodiments of the bonding resin composition of this invention.

The formulation of each embodiment is:

| Components | Parts By Weight |
| --- | --- |
| Maleic anhydride-modified, stereoregular polypropylene product | 1 |
| Base polymer material | 25 |
| 1,3,5-Trimethyl-2,4,6-tris(3,5-di-t-butyl-4-hydroxy benzyl) benzene | 0.025 |
| CaO | 0.005 |

In both Examples the maleic anhydride-modified stereoregular polypropylene product is the Hercoprime A product described above.

In Example 1 the base polymer material consists of a stereoregular polypropylene product such as the Pro-fax 6501 product described above, and an essentially crystalline sequentially polymerized propylene-ethylene product having a combined ethylene content of about 25% by weight of the product, the weight ratio of one to the other being 1:1. An example of the latter product is Pro-fax 8501 which has a nominal melt flow rate of 3–5 dg/min. (decigrams per minute), and a hindered phenol antioxidant at 50–100 ppm of the product.

In Example 2 the base polymer material consists of an essentially crystalline sequentially polymerized propylene-ethylene product having a combined ethylene content of about 7% by weight of the product, and an essentially crystalline, sequentially polymerized propylene-ethylene product having a combined ethylene content of about 25% by weight of the product, such as the Pro-fax 8501 product described above, at a weight ratio of 1:1. An example of the first product is Pro-fax 7501 which has a nominal melt flow of 3–5 dg/min (decigrams per minute), and a hindered phenol antioxidant at 50–100 ppm of the product.

In the formulation the substituted benzene compound is a hindered phenol antioxidant commercially available as Antioxidant 330 from Ethyl Corporation. The calcium oxide component is present because of its antiacid properties.

These embodiments of the bonding resin composition of this invention are made as above described.

The bonding resin compositions of these examples, are used, for example, by extending them into sheets at a temperature of about 245° C. and applying the sheets to sheets of steel or aluminum or both under pressure and at a temperature of 205° C.

The outstanding properties of the bonding resin composition of this invention are illustrated by the following data obtained in the following described laboratory work in which samples of nine bonding resin compositions were made and tested.

The general formulation of each composition was the same as the above formulation for Examples 1 and 2. The maleic anhydride-modified stereoregular polypropylene component of each sample was the previously referred to Hercoprime A product. The base polymer material composition of each sample was as indicated in the following table in which "PP" means stereoregular polypropylene, "SP P-7E" means an essentially crystalline, sequentially polymerized propylene-ethylene product in which the combined ethylene content is about 7% by weight, and "SP P-25E" means an essentially crystalline, sequentially polymerized propylene-ethylene product in which the combined ethylene content is about 25% by weight. The stereoregular polypropylene used in this test work was the above described Pro-fax 6501 product. The essentially crystalline, sequentially polymerized propylene-ethylene product with 7% ethylene was the Pro-fax 7501 product described above, while the essentially crystalline, sequentially polymerized propylene-ethylene product with an ethylene content of 25% by weight was the above mentioned Pro-fax 8501 product.

The sample in each instance was made by first mixing the base polymer material and the additives in a blender to form a premix, adding the maleic anhydride-modified stereoregular polypropylene product to the premix, and tumble blending. The mixture then was introduced into a ¾ inch Brebender extruder for melt compounding at temperatures of 205°–245° C. Following this step 20 mil sheets were cast at a melt temperature of about 245° C. with a 1 and ¼ inch Hartig extruder and a 6 inch sheet die. The resulting sheets were evaluated for bond strength by preparing 4 inch by 6 inch steel/sheet/steel laminates from each sample sheet and 15-mil Weirchrome ® treated steel sheets in a platen press at a temperature of 205° C., a pressure of about 50 p.s.i., and dwell times of 5, 10, 20, 40, 60, 120 and 180 seconds. The laminates were removed from the press at the end of the respective dwell times, and cooled between two ½ inch aluminum plates. Then the laminates were cut into three 1 inch by 6 inch strips from the middle. These strips were subjected to T-Peel tests (ASTM D-1876) on an Instron instrument with a crosshead speed of 10 inches per minute. The span used was 1 inch. The recorded force was reported as pounds per inch T-Peel. The results are also shown in the following table.

| Experimental No. | Relative Composition of Base Polymer Material | | | T-Peel Strength (lbs/in) Dwell Time (Sec.) | | | | | | |
| --- | --- | --- | --- | --- | --- | --- | --- | --- | --- | --- |
| | PP | SP P-7E | SP P-25E | 5 | 10 | 20 | 40 | 60 | 120 | 180 |
| 1 | 100% | | 0 | 8 | 10 | 10 | 14 | 16 | 15 | 15 |
| 2 | 75% | | 25% | 20 | 30 | 30 | 40 | 50 | 50 | 50 |
| 3 | 50% | | 50% | 85 | 105 | 115 | 105 | 104 | 108 | 108 |
| 4 | 25% | | 75% | 110 | 110 | 120 | 105 | 115 | 100 | 95 |
| 5 | 0 | | 100% | 83 | 86 | 84 | 84 | 84 | 60 | 60 |
| 6 | | 100% | 0 | 45 | 66 | 80 | 80 | 80 | 70 | 80 |
| 7 | | 75% | 25% | 75 | 90 | 100 | 101 | 98 | 94 | 100 |
| 8 | | 50% | 50% | 120 | 115 | 130 | 140 | 140 | 130 | 124 |

| | -continued | | | | | | | | |
|---|---|---|---|---|---|---|---|---|---|
| | | | T-Peel Strength (lbs/in) | | | | | | |
| Experimental | Relative Composition of Base Polymer Material | | | Dwell Time (Sec.) | | | | | |
| No. | PP | SP P-7E | SP P-25E | 5 | 10 | 20 | 40 | 60 | 120 | 180 |
| 9 | | 25% | 75% | 110 | 95 | 105 | 110 | 100 | 90 | 95 |

From the above table it can be seen that when the base polymer material consists essentially of a blend of stereo-regular polypropylene and essentially crystalline, sequentially polymerized propylene-ethylene product having a combined ethylene content of about 25% by weight at weight ratios of 25:75–75:25 (or 1:3–3:1), or a blend of essentially crystalline, sequentially polymerized propylene-ethylene product having a combined ethylene content of about 7% by weight, and an essentially crystalline, sequentially polymerized propylene-ethylene product with an ethylene content of 25% by weight at weight ratios of 25:75–75:25 (or 1:3–3:1), the bonding resin composition has the following three major advantages compared to those samples in which the base polymer material consists essentially of just the individual members of the foregoing combinations:

(a) Faster bonding cycles—high bond strengths are achieved in a short dwell time (see values at 5 seconds);

(b) Higher bond strength—at dwell times of 10 seconds or longer more than 100 pounds per inch T-Peel are achieved from a 50:50 combination compared to 10–80 pounds per inch obtained with the individual components of the base polymer; and (c) More stable bonds—the bond strengths are relatively insensitive to dwell time.

Hence, this invention provides an improved bonding resin composition, improved laminates, and an improved method for making laminates.

The invention provided a bonding resin composition, a resin/metal laminate and a method of making the laminate. The bonding resin composition as discussed above is a blend of maleic anhydride-modified, stereoregular polypropylene having a combined maleic anhydride content of about 0.2 to about 0.8% by weight of the modified polypropylene. Preferably, the combined maleic anhydride content is from about 0.5 to about 0.8% by weight of the modified polypropylene.

The base polymer material is at a concentration of about 4 to about 70 parts by weight per part by weight of said maleic anhydride-modified polypropylene. Preferably, the base polymer material is at a concentration of about 12 to about 50 parts by weight per part by weight of said maleic anhydride-modified polypropylene. More preferably, the base polymer material is at a concentration of about 17 to about 40 parts by weight per part by weight of said maleic anhydride-modified polypropylene. Most preferably, the base polymer material is at a concentration of about 25 parts. The low ethylene content essentially crystalline sequentially polymerized propylene-ethylene product preferably has a combined ethylene content of from 0 to 14 percent by weight. Most preferably, the low ethylene content product has a combined ethylene content of about 7 percent by weight.

The high ethylene content essentially crystalline sequentially polymerized propylene-ethylene product preferably has a combined ethylene content of from 15 to about 30 percent by weight, Most preferably, the high ethylene content product has a combined ethylene content of about 25 percent by weight.

Preferably, the weight ratio of low ethylene content to high ethylene content product is from about 1:4 to about 4:1. Most preferably, this ratio is from about 1:3 to about 3:1.

Other features, advantages and specific embodiments of this invention will become readily apparent to those exercising ordinary skill in the art after reading the foregoing disclosures. Such specific embodiments are within the scope of the claimed subject matter unless expressly excluded by claim language. Moreover, while specific embodiments of this invention have been described in considerable detail, variations and modifications of them can be effected without departing from the spirit and scope of the invention as disclosed and claimed.

The expression "consisting essentially of" as used in this specification excludes any unrecited substance at a concentration sufficient to substantially adversely affect the essential properties and characteristics of the composition being defined, while permitting the presence of one or more unrecited substances at concentrations insufficient to substantially adversely affect said essential properties and characteristics.

I claim:

1. A bonding resin composition composed of a blend consisting essentially of
   (a) maleic anhydride-modified, stereoregular polypropylene in which the combined maleic anhydride is from about 0.2 to about 0.8 percent by weight of said modified polypropylene; and
   (b) base polymer material at a concentration of from about 4 to about 70 parts by weight per part by weight of said maleic anhydride-modified polypropylene, and selected from the group consisting of
      (i) stereoregular polypropylene and essentially crystalline, sequentially polymerized propylene-ethylene product comprising a blend of propylene homopolymer, ethylene homopolymer, and random copolymers of propylene and ethylene, and having a combined ethylene content of from about 15 to about 30 percent by weight, the weight ratio of said polypropylene to said product being about 1:4 to about 4:1, and
      (ii) essentially crystalline sequentially polymerized propylene-ethylene product having a combined ethylene content of from about 0 to about 14 percent by weight, and essentially crystalline sequentially polymerized propylene-ethylene product comprising a blend of propylene homopolymer, ethylene homopolymer, and random copolymers of propylene and ethylene, and having a combined ethylene content of from about 15 to about 30 percent by weight, the weight ratio of these two products being about 1:4 to about 4:1.

2. A bonding resin composition according to claim 1 in which, when the base polymer material is (i), the weight ratio of said polypropylene to said product is about 1:3.

3. A bonding resin composition according to claim 1 in which, when the base polymer material is (ii), the weight ratio of said two products is about 1:1.

4. The composition of claim 1 wherein said combined maleic anhydride is from about 0.5 to about 0.8 percent by weight of said modified polypropylene.

5. The composition of claim 1 wherein said base polymer material is at a concentration of from about 12 to about 50 parts by weight per part by weight of said maleic anhydride-modified polypropylene.

6. The composition of claim 5 wherein said base polymer material is at a concentration of from about 17 to about 40 parts by weight per part by weight of said maleic anhydride-modified polypropylene.

7. The composition of claim 1 wherein said maleic anhydride-modified, stereoregular polypropylene in which the combined maleic anhydride is 0.5–0.8% by weight of said modified polypropylene; and base polymer material at a concentration of about 25 parts by weight per part by weight of said maleic anhydride-modified polypropylene, and selected from the group consisting of (i) stereoregular polypropylene and essentially crystalline, sequentially polymerized propylene-ethylene product comprising a blend of propylene homopolymer, ethylene homopolymer, and random copolymers of propylene and ethylene, and having a combined ethylene content of 25% by weight, the weight ratio of said propylene to said product being about 1:3–3:1, and (ii) essentially crystalline sequentially polymerized propylene-ethylene product having a combined ethylene content of 7% by weight, and essentially crystalline sequentially polymerized propylene-ethylene product comprising a blend of propylene homopolymer, ethylene homopolymer, and random copolymers of propylene and ethylene, and having a combined ethylene content of 25% by weight, the weight ratio of these two products being about 1:3–3:1.

8. A bonding resin composition composed of a blend consisting essentially of
(a) maleic anhydride-modified, stereoregular polypropylene in which the combined maleic anhydride is 0.2–0.8% by weight of said modified polypropylene; and
(b) base polymer material at a concentration of about 4 to 70 parts by weight per part by weight of said maleic anhydride-modified polypropylene, said base polymer being a low ethylene content essentially crystalline sequentially polymerized propylene-ethylene product having a combined ethylene content of from 0 to 14% by weight, and a high ethylene content essentially crystalline sequentially polymerized propylene-ethylene product comprising a blend of propylene homopolymer, ethylene homopolymer, and random copolymers of propylene and ethylene, and having a combined ethylene content of from 15 to about 30% by weight, the weight ratio of said low ethylene content product to said high ethylene content product being about 1:4–4:1.

* * * * *